(12) United States Patent     (10) Patent No.:   US 12,560,406 B2

Rascon et al.     (45) Date of Patent:    Feb. 24, 2026

(54) VACUUM INSULATED VERTICAL LAUNCH SYSTEM (VLS)

(71) Applicant: Raytheon Company, Arlington, VA (US)

(72) Inventors: John Rascon, Tucson, AZ (US); Christopher M. Schott, Andover, KS (US); Mark J. Meisner, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 10 days.

(21) Appl. No.: 18/635,928

(22) Filed: Apr. 15, 2024

(65) Prior Publication Data

US 2025/0321079 A1     Oct. 16, 2025

(51) Int. Cl.
*F41F 3/04*     (2006.01)
*F16L 59/065*     (2006.01)

(52) U.S. Cl.
CPC .......... *F41F 3/0413* (2013.01); *F16L 59/065* (2013.01)

(58) Field of Classification Search
CPC .... F41F 3/0413; F41F 3/00; F41F 3/04; F41F 3/042; F41F 3/052; F41F 3/077
USPC ... 89/1.8, 1.801, 1.802, 1.812, 1.815, 1.816, 89/1.817, 1.82
See application file for complete search history.

(56) References Cited

U.S. PATENT DOCUMENTS

| | | | | | |
|---|---|---|---|---|---|
| 3,158,062 | A | * | 11/1964 | Feiler | F41F 3/07 |
| | | | | | 89/1.817 |
| 4,044,648 | A | * | 8/1977 | Piesik | F41F 3/0413 |
| | | | | | 89/1.816 |
| 4,373,420 | A | * | 2/1983 | Piesik | F41F 3/0413 |
| | | | | | 89/1.817 |
| 5,162,605 | A | * | 11/1992 | Piesik | F41F 3/077 |
| | | | | | 89/1.816 |
| 5,194,688 | A | * | 3/1993 | Piesik | F41F 3/0413 |
| | | | | | 89/1.816 |
| 5,206,450 | A | * | 4/1993 | Piesik | F41F 3/0413 |
| | | | | | 89/1.8 |
| 5,837,917 | A | * | 11/1998 | Macnab | F41F 3/0413 |
| | | | | | 89/1.816 |
| 6,526,860 | B2 | * | 3/2003 | Facciano | F41F 3/042 |
| | | | | | 89/1.819 |
| 12,065,990 | B1 | * | 8/2024 | Rascon | F02K 9/974 |
| 2017/0313492 | A1 | | 11/2017 | Seiders et al. | |
| 2025/0101933 | A1 | * | 3/2025 | Rascon | F02K 9/34 |
| 2025/0102281 | A1 | * | 3/2025 | Rascon | F42B 12/207 |

* cited by examiner

*Primary Examiner* — John Cooper

(74) *Attorney, Agent, or Firm* — Schwegman Lundberg & Woessner, P.A.

(57) ABSTRACT

Vacuum insulation layers are provided for one or more components of a launch system for a plurality of missiles. The vacuum insulation layers may be integrated into the walls of the components or provided in inserts attached to the components. A medium or high vacuum is pulled on a sealed void space in the walls or the insert. The vacuum insulation layer provides a thermal conductivity (Tcond_vac) of less than one-third of a thermal conductivity of air (Tcond_air). The vacuum insulation layer delays desensitization or inhibits premature reaction of the energetic materials inside the missiles due to high external temperatures. The insulation layers allow for more compact and dense configurations of the launch system and missiles.

20 Claims, 5 Drawing Sheets

VACUUM INSULATED VERTICAL LAUNCH SYSTEM (VLS)

BACKGROUND

Field

This disclosure relates to vertical launch systems for multiple missiles, rockets or other projectiles, and more particularly to the provision and management of thermal insulation in the launch system.

Description of the Related Art

Vertical launch systems (VLS) are configured to store and launch, in rapid succession, multiple projectiles (e.g., guided projectiles, rockets, missiles or the like). It is important that the launch system support firing the projectiles with minimal time delay between launches. In many cases, the launch system is re-loaded and fired multiple times until it must be taken out of service. The number of times the launch system can be re-used is another important factor. The launch system itself is typically supported on a land vehicle or ship. The form factor in both the density of projectiles and the depth of the launch system matters. Furthermore, the launch system must be configured to delay desensitization or inhibit premature reaction of the energetic material due to high external temperature. The provision and management of thermal insulation in the launch system impacts each of these factors.

An exemplary VLS module includes a plurality of missile cells, each cell configured for containing a missile and launching a missile out a top thereof, a common exhaust plenum and at least one exhaust tube connected via at least one first passageway to the common exhaust plenum. Each missile cell has an upper region (e.g., a launch tube or launch canister) for releasing a missile during launch and a lower region connected via a second passageway and an aft cover with the common exhaust plenum to transfer exhaust gases from the missile into the common exhaust plenum and through the exhaust tube and out of the module. The aft cover is configured to open during missile launch and otherwise close to block the reverse flow of exhaust gases from the common exhaust plenum back into the cells. At least the lower region of each cell, the common exhaust plenum and at least one exhaust tube have inner surfaces covered with an insulating layer of a burn resistant material. The inner surfaces of the upper region are suitably covered with an insulating layer of burn resistant material to support reuse of the module. The upper and lower regions of each cell, the aft cover, the common exhaust plenum and the exhaust tubes typically have a double-walled construction in which the inner and outer walls are typically supported by ribs or a corrugated structure. The space between the walls is filled with air.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides vacuum insulation layers for one or more components of a launch system for a plurality of missiles. The layer may be integrated into the walls of the components or provided in inserts attached to the components. The vacuum insulation layer delays desensitization or inhibits premature reaction of the energetic materials inside the missiles due to high external temperatures. The insulation layers allow for more compact and dense configurations of the launch system and missiles.

In an embodiment a vertical launch system (VLS) module includes a plurality of missile cells in which each cell is configured for containing a missile and launching a missile, a common exhaust plenum and at least one exhaust tube connected via at least one first passageway to the common exhaust plenum. Each missile cell has an upper region (e.g., a launch tube or launch canister) for releasing a missile during launch and a lower region connected via a second passageway and an aft cover with the common exhaust plenum to transfer exhaust gases from the missile into the common exhaust plenum and through the exhaust tube and out of the module. The aft cover is configured to open during missile launch and otherwise close to block the reverse flow of exhaust gases from the common exhaust plenum back into the cells. At least the lower region of each cell, the common exhaust plenum and at least one exhaust tube have inner surfaces covered with an insulating layer of a burn resistant material. At least one and suitably all of the upper region, lower region, common exhaust plenum and exhaust tube have a double-walled structure that defines a sealed void space that held under a medium or high vacuum with a thermal conductivity ($Tcond\_vac$) of less than one-third of a thermal conductivity of air ($Tcond\_air$) to form a vacuum insulation layer.

In different embodiments, the vacuum may be a medium vacuum between 25 Torr and $10^{-3}$ Torr or a high vacuum between $10^{-3}$ Torr and 106 Torr. A higher vacuum (lower pressure) corresponds to less particles or contaminants in the vacuum and thus a lower thermal conductivity. $Tcond\_vac$ may be less than one-fifth $Tcond\_air$ and reach a limit of approximately 6.6× less than air. $Tcond\_vac$ is about one two-hundred and fiftieth (1/250) that of phenolic resin and thus a much better thermal insulator.

In an embodiment, the hollow metal shell includes a corrugated structure between the inner and outer walls that provides structural support. The corrugated structure includes openings therein to contiguously define the sealed void space.

In an embodiment, the thermal conductivity of the vacuum being less than one one-hundredth the thermal conductivity of the burn resistant material.

In an embodiment, inner surfaces of the upper region of each cell are covered with an insulating layer of a burn resistant material to facilitate reloading and relaunching missiles from the module.

In an embodiment, additional insulation is provided by positioning a plurality of inserts on an interior or exterior surface of at least one of the upper region, aft cover, lower region, common exhaust plenum or exhaust tube. Each insert itself includes a hollow metal shell defining a sealed void space that is held under a medium or high vacuum.

In an embodiment, an existing launch system whose walls do not provide a vacuum insulation layer can be retro-fit by positioning a plurality of inserts on an interior or exterior surface of at least one of the upper region, aft cover, lower region, common exhaust plenum or exhaust tube. Each insert itself includes a hollow metal shell defining a sealed void space that is held under a medium or high vacuum.

These and other features and advantages of the disclosure will be apparent to those skilled in the art from the following detailed description of preferred embodiments, taken together with the accompanying drawings, in which:

DETAILED DESCRIPTION

Vacuum insulation layers are provided for one or more components of a launch system for a plurality of missiles. The layer may be integrated into the walls of the components or provided as inserts attached to the components. A medium or high vacuum is pulled on a sealed void space in the walls or the insert. The vacuum insulation layer has a thermal conductivity (Tcond_vac) of less than one-third of a thermal conductivity of air (Tcond_air). The vacuum insulation layer delays desensitization or inhibits premature reaction of the energetic materials inside the missiles due to high external temperatures. The insulation layers allow for more compact and dense configurations of the launch system and missiles.

Figures 1, 2:
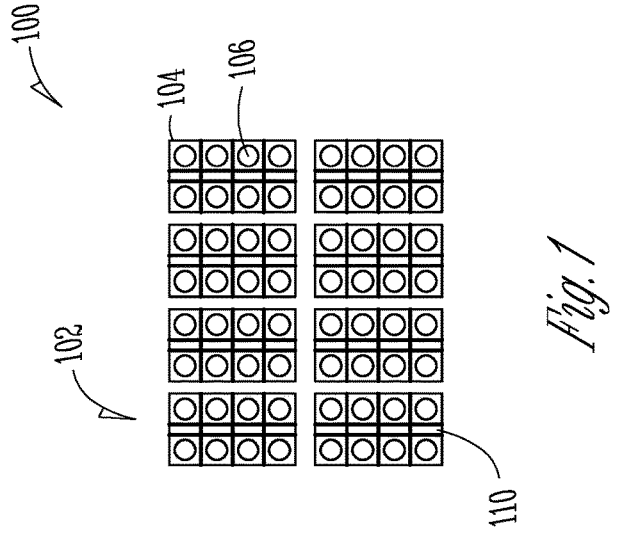
FIG. 1 is a top view of a VLS that includes 8 modules with each module including 8 cells.
FIG. 2 is a section view of a pair of cells coupled to the common exhaust plenum that share an exhaust tube in which vacuum insulating layers are formed in the walls of the upper region of the cell, a lower region of the cell, a common exhaust plenum and a vertical exhaust tube.

Referring now to FIGS. 1 and 2, a VLS 100 includes 8 modules 102 with each module including 8 cells 104. Each cell is configured for containing a missile 106 and launching a missile out a top thereof. Each cell is coupled to a common exhaust plenum 108 and at least one vertical exhaust tube 110 via at least one first passageway 112 to the common exhaust plenum. In this configuration, the vertical exhaust tube 110 is placed between each pair of cells 104, e.g., 4 exhaust tubes for an 8 cell module. A plenum is a pressurized housing containing a gas (such as air or hot exhaust gasses) at positive pressure. One of its functions is to equalize pressure for more even distribution, compensating for irregular supply or demand. It is typically relatively large in volume compared to the upper/lower regions or exhaust tube and thus has relative low velocity compared to the system's other components.

Each missile cell has an upper region 114 (e.g., a launch tube or launch canister) for releasing a missile during launch and a lower region 116 (e.g., a canister adapter) connected via a second passageway 118 and an aft cover 120 with the common exhaust plenum 108 to transfer exhaust gases from the missile into the common exhaust plenum and through the exhaust tube 110 and out of the module. The aft cover 120 is configured to open during missile launch and otherwise close to block the reverse flow of exhaust gases 121 from the common exhaust plenum back into the cells. A cell hatch 122 opens at missile launch.

At least the lower region 116 of each cell, the common exhaust plenum 108 and at least one exhaust tube 110 have inner surfaces covered with an insulating layer 123 of a burn resistant material. The inner surfaces of the upper region 114 are suitably covered with an insulating layer of burn resistant material to support reuse of the module. The surfaces of the aft cover 120 and cell hatch 122 that may be exposed to hot exhaust gases may also be covered with a layer of the burn resistant material.

The burn resistant material may be a phenolic resin selected for its resistance to erosion or corrosion in the presence of very hot combustion gases (e.g., its low char rates). The material may be a 3-ply layer having a homogeneous base layer, a char layer and an ablative layer. If the insulating material is quickly degraded and removed it is of no value. However, phenolic resin is not a very good insulating material. Its thermal conductivity is approximately 1 to 1.5 W/mK (Watts per Meter-Kelvin) whereas air is approximately 0.026 W/mK. The thermal conductivity of the resin is at least 38× that of air.

At least one and suitably all of the upper region 114, lower region 116, common exhaust plenum 108 and at least one exhaust tube 110 have a double-walled structure 124 that defines a sealed void space 126 that is held under a medium or high vacuum 130 with a thermal conductivity (Tcond_vac) of less than one-third a thermal conductivity of air (Tcond_air) to form a vacuum insulation layer. As shown, the double-walled structure includes a corrugated structure 132 between the inner and outer walls that provides structural support. The corrugated structure 132 includes openings 134 therein to contiguously define the sealed void space. The openings 134 are a sufficient number of small holes to maintain structural integrity while allowing the vacuum 130 to reach every individual chamber created by the corrugation to form a single contiguous sealed void space 126. The aft cover 120 and cell hatch 122 may also be similarly configured to provide vacuum insulation layers. The aft cover 120 protects the upper region from gases created by neighboring cells. The cell hatch 122 protects the cell from thermal threats during shipment or storage of the missile.

The vacuum insulation layers provide better insulation than open-air double-walled structures. This can be leveraged to reduce spacing between the exhaust tube and cell thereby increasing the density of missiles in a given footprint. This can also be leveraged to reduce the thickness of the heat resistant layer. In particular in a 3-ply layer, the thicknesses of the homogenous and ablative layers may be reduced. The heat resistant layer is just thick enough to protect the components from the corrosive effects of the hot exhaust gasses. The vacuum insulation layers may also reduce the required depth or volume of the plenum.

Figures 3A, 3B:
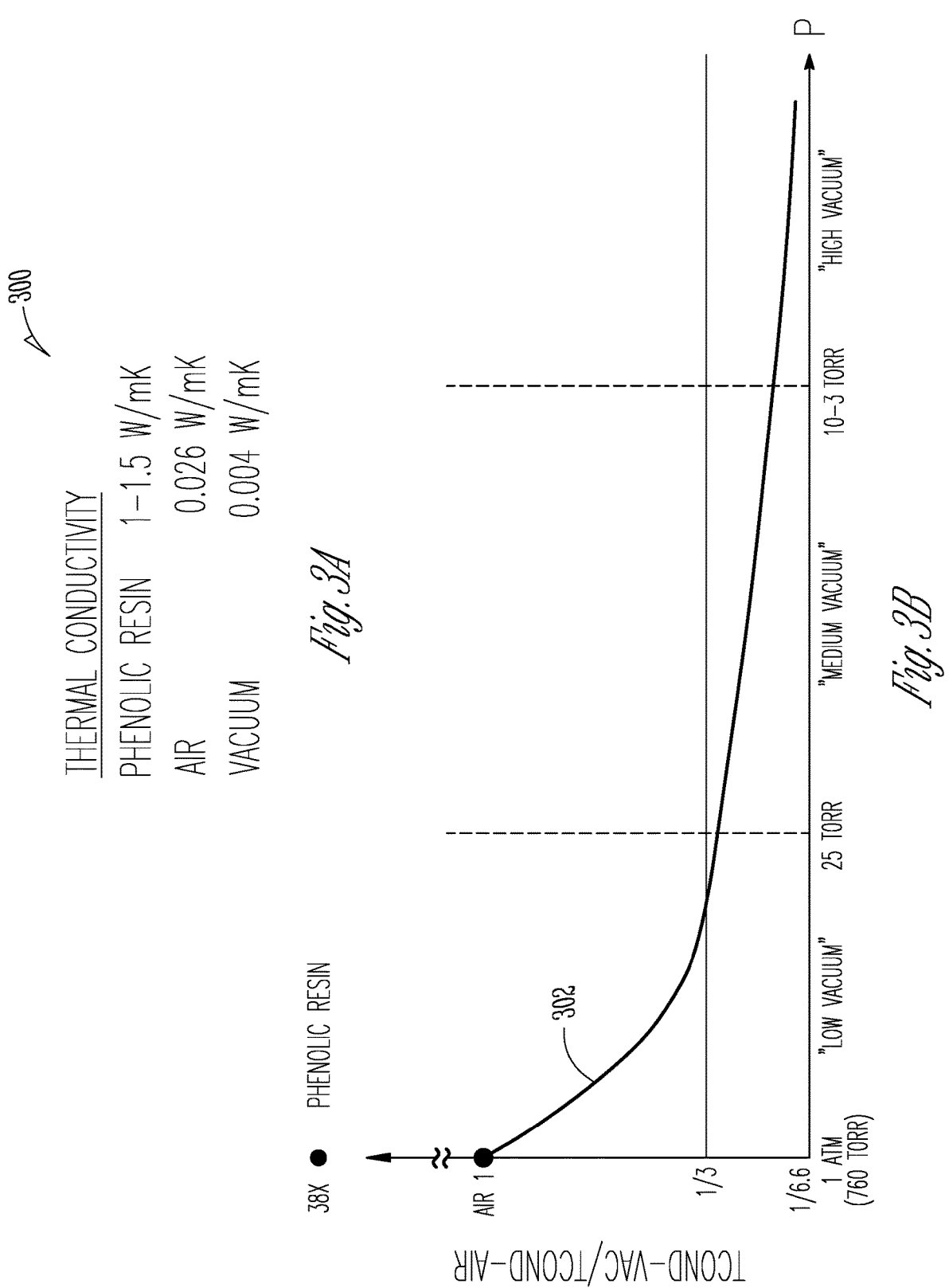
FIGS. 3A and 3B are a table and a plot comparing the thermal conductivity of various vacuum levels to air and phenolic resin.

Referring now to Table 300 of FIG. 3A and a plot 302 of the relative thermal conductivity of a vacuum to air in FIG. 3B, at sea level and a temperature of 25 C, air has a thermal conductivity of approximately 0.026 W/mK, phenolic resin between 1 and 1.5 W/mK and a high vacuum of approximately 0.004 W/mK. As defined herein, a low vacuum is between 760 Torr (1 atm) and 25 (Torr), medium vacuum between 25 Torr and $10^{-3}$ Torr and a high vacuum between $10^{-3}$ Torr and 106 Torr. Under low vacuum the difference in thermal conductivity with air is insufficient to provide the requisite thermal insulating benefits given the requirement to form and hold a vacuum. At medium and high vacuum, the thermal conductivity of the vacuum is less than ⅓, preferably less than ⅕ and ideally approximately 1/6.6 that of air. This provides a substantial thermal insulating benefit over air, and a very substantial thermal insulting improvement over phenolic resin.

Figure 4:
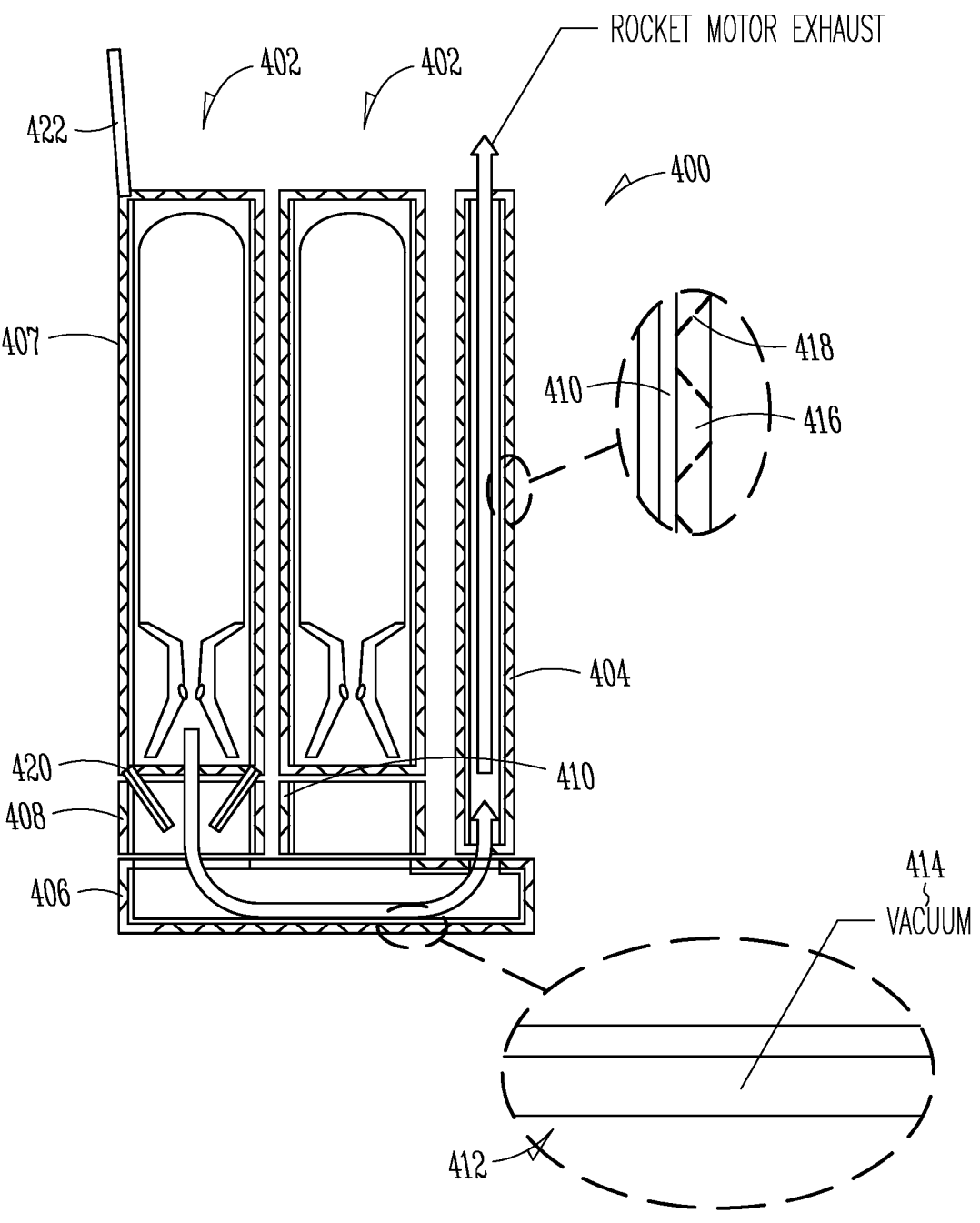
FIG. 4 is a section view of another embodiment of a VLS.

Referring now to FIG. 4, in an alternate configuration of a VLS 400 a plurality of cells 402 are positioned side-by-side with a vertical exhaust tube 404 positioned at the edge of the module. Each cell 402 and the vertical exhaust tube 404 are coupled to a common exhaust plenum 406. The inner surfaces of the cell 402, common exhaust plenum 406 and vertical exhaust tube 404 are provided with an insulating layer 410 of heat resistant material as described previously. The common exhaust plenum, upper and lower regions 407 and 408 of each cell and the vertical exhaust tube each have a double-walled construction 412 that is sealed and held under a medium or high vacuum 414 to form an insulating layer. As previously described, the double-walled construction 412 may include a corrugated or similar structure 416 that provides structural support. If so, openings 418 are formed in structure 416 to form a single contiguous sealed void space in the particular component of the VLS. The aft cover 420 and top hatch 422 may or may not be configured as vacuum insulating layers.

Figure 5:
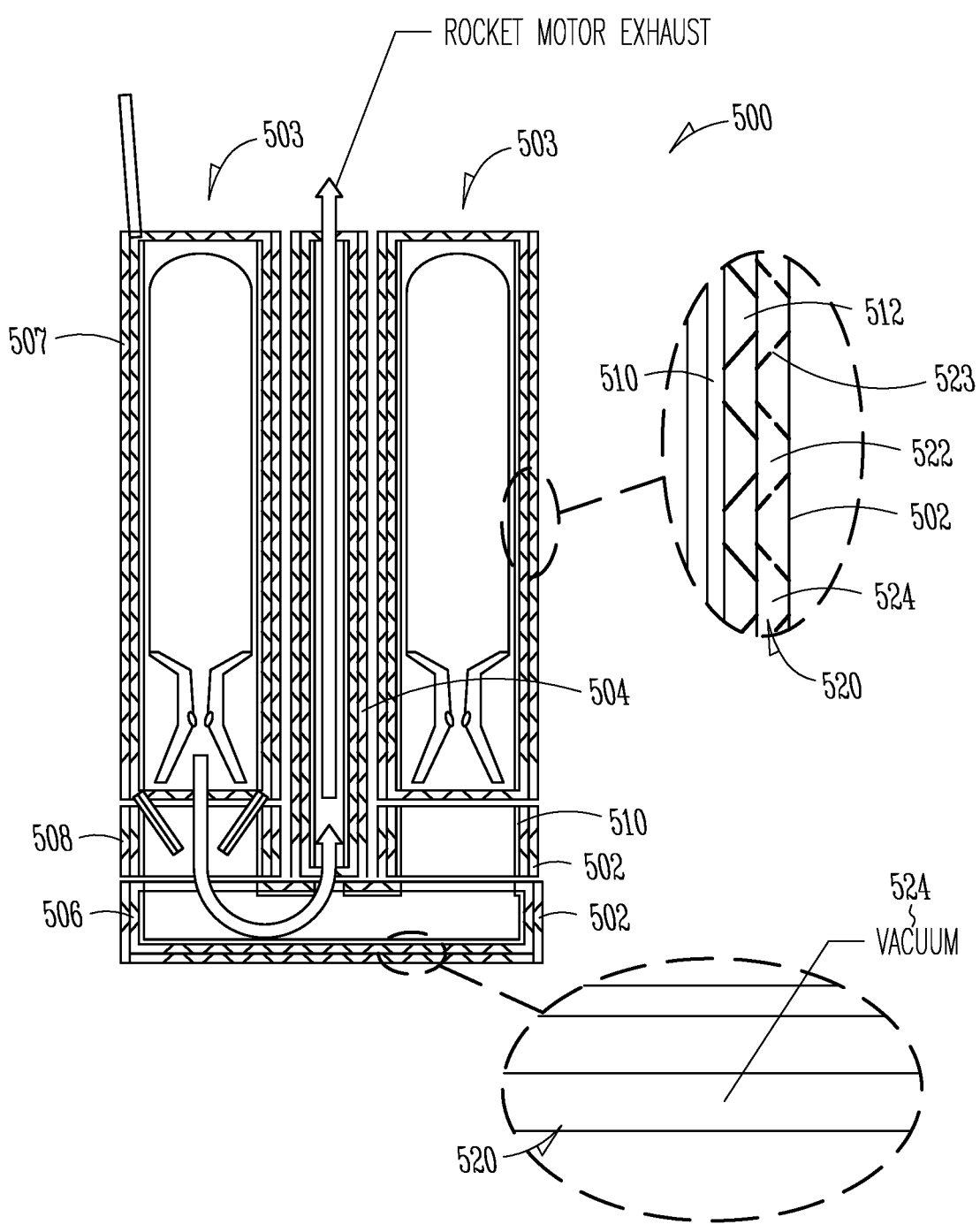
FIG. 5 is a section view of a VLS retro-fit with a plurality of vacuum insulated inserts attached to the external surfaces of the components of the VLS.
Figure 6:
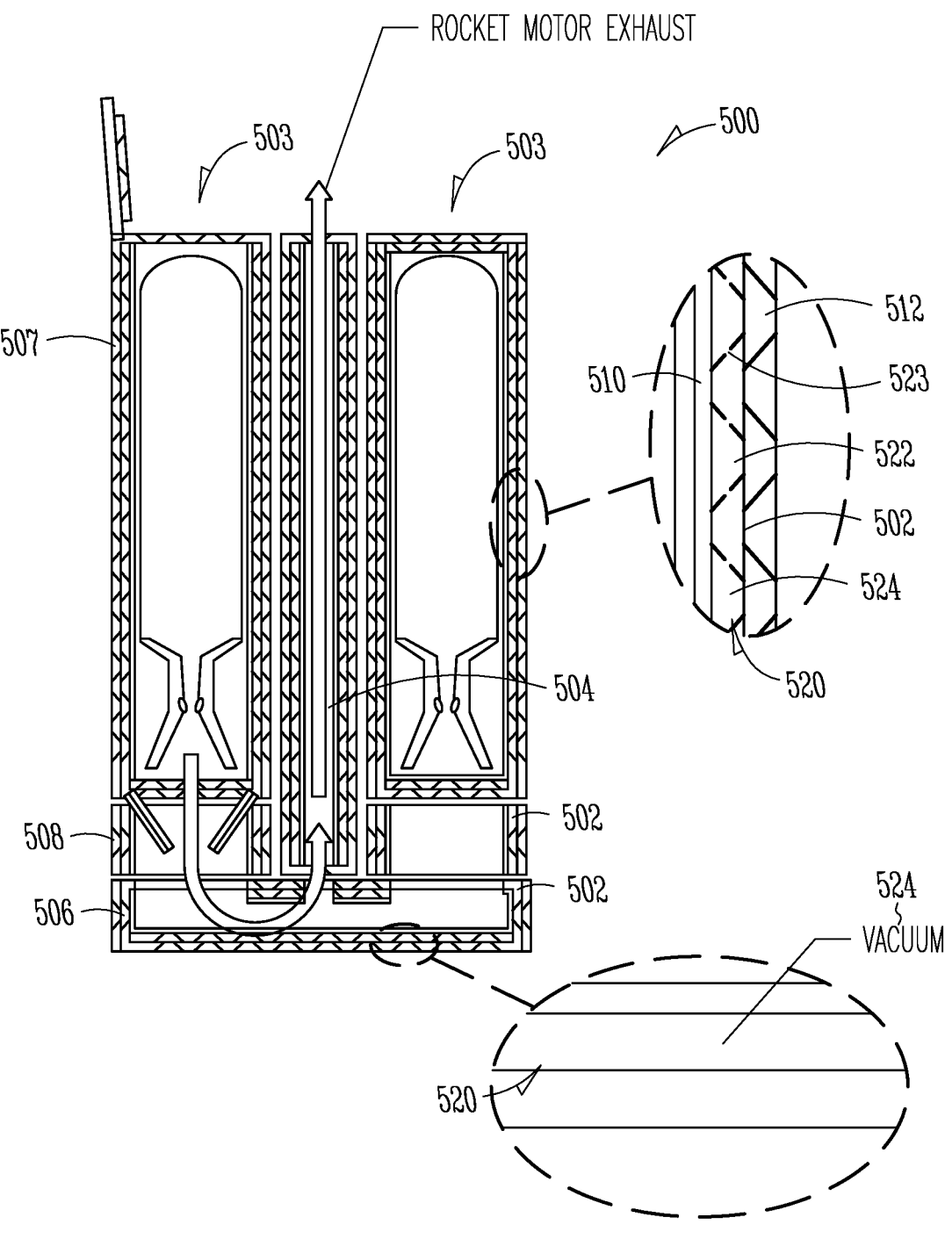
FIG. 6 are views of a VLS retro-fit with a plurality of vacuum insulated inserts attached to the interior surfaces of the components of the VLS.

As shown in FIGS. 5 and 6, an existing VLS 500 can be retro-fit by attaching a plurality of vacuum inserts 502 to the external and internal surfaces, respectively, of the various components of the VLS. When attached internally, the insulating layer of heat resistant material must be removed and then re-applied after the inserts 502 are attached. In this example, the components of the existing VLS have a double-walled structure with a corrugated support structure. However, the component's double-walled structure is not sealed, is air-filled and not held under vacuum.

The existing VLS 500 includes a plurality of cells 503 that are separated by a vertical exhaust tube 504. Each cell 503 and the vertical exhaust tube 504 are coupled to a common exhaust plenum 506. The inner surfaces of the cell 503, common exhaust plenum 506 and vertical exhaust tube 504 are provided with an insulating layer 510 of heat resistant material as described previously. The common exhaust plenum, upper and lower regions 507 and 508 of each cell and the vertical exhaust tube each have a double-walled construction 512 that is unsealed and filled with air. As previously described, the double-walled construction 512 may include a corrugated or similar structure that provides structural support.

As shown in FIG. 5, inserts 502 line the external surfaces of the upper and lower regions 507 and 508 of each cell, the common exhaust plenum 506 and the vertical exhaust tube 504. In this example, each insert 502 has a double-walled constructions 520 including a corrugated structure 522 in which openings 523 are formed to create a single contiguous sealed void space that is held under a medium or high vacuum 524 at sea level and 25 C.

As shown in FIG. 6, inserts 502 line the internal surfaces of the upper and lower regions 507 and 508 of each cell, the common exhaust plenum 506 and the vertical exhaust tube 504. In this example, each insert 502 has a double-walled construction 520 including a corrugated structure 522 in which openings 523 are formed to create a single contiguous sealed void space that is held under a medium or high vacuum 524 at sea level and 25 C.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A vertical launch system (VLS) module, comprising:
a plurality of missile cells, each cell configured for containing a missile and launching a missile out a top thereof,
a common exhaust plenum;
at least one exhaust tube connected via at least one first passageway to the common exhaust plenum;
each said missile cell having an upper region for releasing a missile during launch and a lower region connected via a second passageway and an aft cover with the common exhaust plenum to transfer exhaust gases from the missile into the common exhaust plenum and through the exhaust tube and out of the module, said aft cover configured to open during missile launch and otherwise close to block the reverse flow of exhaust gases from the common exhaust plenum back into the cells;
wherein at least the lower region of each cell, the aft cover, the common exhaust plenum and at least one exhaust tube have inner surfaces covered with an insulating layer of a burn resistant material;
said common exhaust plenum having a double-walled structure that defines a sealed void space; and
wherein the sealed void space is held under vacuum with a pressure of less than 25 Torr and a thermal conductivity (Tcond_vac) of less than one-third of a thermal conductivity of air (Tcond_air) to form a vacuum insulation layer.

2. The VLS of claim 1, wherein the pressure in the void space is a medium vacuum between 25 Torr and $10^{-3}$ Torr.

3. The VLS of claim 1, wherein the pressure in the void space is a high vacuum between $10^{-3}$ Torr and $10^{-6}$ Torr.

4. The VLS of claim 1, wherein Tcond_vac is less than one-fifth Tcond_air.

5. The VLS of claim 1, wherein said common exhaust plenum has a corrugated structure within the double-walled structure, wherein the corrugated structure includes openings therein to contiguously define the sealed void space.

6. The VLS of claim 1, wherein Tcond_vac is less than one one-hundredth the thermal conductivity of the burn resistant material.

7. The VLS of claim 1, wherein inner surfaces of the upper region of each cell are covered with an insulating layer of a burn resistant material.

8. The VLS of claim 1, wherein the upper region of each cell has a double-walled structure that defines a sealed void space that is held under vacuum with a pressure of less than 25 Torr.

9. The VLS of claim 1, wherein the lower region of each cell has a double-walled structure that defines a sealed void space that is held under vacuum with a pressure of less than 25 Torr.

10. The VLS of claim 1, wherein the aft cover for each cell has a double-walled structure that defines a sealed void space that is held under vacuum with a pressure of less than 25 Torr.

11. The VLS of claim 1, wherein at least one exhaust tube has a double-walled structure that defines a sealed void space that is held under vacuum with a pressure of less than 25 Torr.

12. A vertical launch system (VLS) module, comprising:
a plurality of missile cells, each cell configured for containing a missile and launching a missile out a top thereof,
a common exhaust plenum;
at least one exhaust tube connected via at least one first passageway to the common exhaust plenum;

each said missile cell having an upper region for releasing a missile during launch and a lower region connected via a second passageway and an aft cover with the common exhaust plenum to transfer exhaust gases from the missile into the common exhaust plenum and through the exhaust tube and out of the module, said aft cover configured to open during missile launch and otherwise close to block the reverse flow of exhaust gases from the common exhaust plenum back into the cells;

wherein at least the lower region of each cell, the aft cover, the common exhaust plenum and at least one exhaust tube have inner surfaces covered with an insulating layer of a burn resistant material;

wherein each of the upper region, the lower region, the common exhaust plenum and at least one exhaust tube have a double-walled structure that each define a sealed void space; and wherein each of the sealed void spaces is held under vacuum with a pressure of less than 25 Torr and a thermal conductivity (Tcond_vac) of less than one-third of the thermal conductivity of air (Tcond_air) to form a vacuum insulation layer.

13. The VLS of claim 12, wherein the pressure in the void space is a medium vacuum between 25 Torr and $10^{-3}$ Torr.

14. The VLS of claim 12, wherein the pressure in the void space is a high vacuum between $10^{-3}$ Torr and $10^{-6}$ Torr.

15. The VLS of claim 12, wherein each of the double-walled structures include a corrugated structure having openings therein to contiguously define the sealed void space.

16. The VLS of claim 12, wherein the thermal conductivity of the vacuum is less than one one-hundredth the thermal conductivity of the burn resistant material.

17. A vertical launch system (VLS) module, comprising:
a plurality of missile cells, each cell configured for containing a missile and launching a missile out a top thereof,
a common exhaust plenum;
at least one exhaust tube connected via at least one first passageway to the common exhaust plenum;
each said missile cell having an upper region for releasing a missile during launch and a lower region connected via a second passageway and an aft cover with the common exhaust plenum to transfer exhaust gases from the missile into the common exhaust plenum and through the exhaust tube and out of the module, said aft cover configured to open during missile launch and otherwise close to block the reverse flow of exhaust gases from the common exhaust plenum back into the cells;
wherein at least the lower region of each cell, the aft cover, the common exhaust plenum and at least one exhaust tube have inner surfaces covered with an insulating layer of a burn resistant material;
a plurality of inserts attached to at least one of the upper region, the lower region, the common exhaust plenum or the exhaust tube, each insert having a hollow metal shell defining a sealed void space therein;
wherein each of the sealed void spaces is held under vacuum with a pressure of less than 25 Torr and a thermal conductivity (Tcond_vac) of less than one-third of the thermal conductivity of air (Tcond_air) to form a vacuum insulation layer.

18. The VLS of claim 17, wherein the pressure in the void space is a medium vacuum between 25 Torr and $10^{-3}$ Torr.

19. The VLS of claim 17, wherein the pressure in the void space is a high vacuum between $10^{-3}$ Torr and $10^{-6}$ Torr.

20. The VLS of claim 17, wherein each of the lower region of each cell, the common exhaust plenum and at least one exhaust tube have a double-walled structure that defines a void space filled with air.

* * * * *